United States Patent
Chatilov et al.

(10) Patent No.: US 8,073,124 B2
(45) Date of Patent: Dec. 6, 2011

(54) SYSTEM AND METHOD TO IDENTIFY AND ASSOCIATE CALL LEGS IN SESSION INITIATION PROTOCOL BACK TO BACK USER AGENTS

(75) Inventors: Alexandre Chatilov, San Jose, CA (US); Jeffrey M. Blohm, Portola Valley, CA (US); Shakil Malhotra, Portola Valley, CA (US); Jagjiwan Virk, Milpitas, CA (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 1525 days.

(21) Appl. No.: 11/484,174

(22) Filed: Jul. 11, 2006

(65) Prior Publication Data
US 2008/0037752 A1    Feb. 14, 2008

(51) Int. Cl.
*H04M 3/42* (2006.01)
*H04L 12/16* (2006.01)

(52) U.S. Cl. .................................. 379/202.01; 370/260

(58) Field of Classification Search ............ 379/202.01; 370/260
See application file for complete search history.

(56) References Cited

U.S. PATENT DOCUMENTS

| | | | | |
|---|---|---|---|---|
| 5,920,546 | A * | 7/1999 | Hebert et al. | 370/260 |
| 7,474,634 | B1 * | 1/2009 | Webster et al. | 370/261 |
| 2004/0037407 | A1 * | 2/2004 | Gourraud et al. | 379/202.01 |
| 2006/0245566 | A1 * | 11/2006 | Parker | 379/202.01 |

OTHER PUBLICATIONS

Amir Zmora, "Bringing Telephony Features into SIP Networks with Back to Back User Agent", at http://www.sipcenter.com/sip.nsf/html/Bringing+Telephony+Features+into+SIP+Networks+with+Back+To+Back+User+Agent (last visited Jun. 27, 2006).
G. Camarillo et al., "SIP: Session Initiation Protocol", The Internet Society 2002.

* cited by examiner

*Primary Examiner* — Rasha Al Aubaidi

(57) ABSTRACT

A system and method for simplifying Session Initiation Protocol ("SIP") Back To Back User Agent ("B2BUA") development by associating different call legs with each other across multiple SIP entities. Call legs may be associated with one another through a common or shared identification.

21 Claims, 7 Drawing Sheets

SYSTEM AND METHOD TO IDENTIFY AND ASSOCIATE CALL LEGS IN SESSION INITIATION PROTOCOL BACK TO BACK USER AGENTS

BACKGROUND

The present disclosure relates to call identification by a Session Initiation Protocol ("SIP") Back To Back User Agent ("B2BUA").

Session Initiation Protocol ("SIP") is a protocol or standard for handling an interactive user session. The session may involve any multimedia element. Voice over IP ("VoIP") calls may use SIP. SIP is used as a signaling protocol in many different VoIP offerings, including for example Microsoft Live Communications Server and the 3GPP IP Multimedia Subsystem ("IMS") architecture. Generally, SIP is a protocol for establishing and using multimedia communications.

A Back To Back User Agent ("B2BUA") may be a logical entity that acts as an intermediary in a SIP call. A Signaling gateway that is part of a Session Border Control ("SBC") may be an example of a B2BUA. A B2BUA may also be an interface in an IP Multimedia Subsystem ("IMS") network between the IMS and an external network. The B2BUA may be a proxy for both ends of a SIP call and act as a server on one end and a client on the other end that handles all SIP signaling. In one example, the B2BUA may act as both a client (UAC) and a server (UAS) to both ends of a call. When one client sends a request, acting as a UAC, to the B2BUA, which acts as a UAS to receive the request. The B2BUA may then act as a UAC to send the potentially modified request to another endpoint, which uses UAS functionality to receive the request. If the endpoint then responds, the response is sent using UAC from the endpoint to UAS on the B2BUA. After B2BUA processing, the response is transmitted from the B2BUA via UAC functionality before being received back at the starting endpoint via UAS functionality. In other words, a request may be both sent via UAC functionality and received via UAS functionality.

Specifically, in the SIP specification for the RFC 3261 standard, B2BUA is defined as:

... a logical entity that receives a request and processes it as a user agent server ('UAS'). In order to determine how the request should be answered, it acts as a user agent client ('UAC') and generates requests. Unlike a proxy server, it maintains dialog state and must participate in all requests sent on the dialogs it has established. Since it is a concatenation of a UAC and UAS, no explicit definitions are needed for its behavior.

The B2BUA may allow for additional tracking of calls as well as allow for new features that would otherwise be unavailable in a traditional end to end call. The B2BUA may receive, respond to, and generate requests. In other words, the SIP signaling, from call origination to call termination can be controlled by the B2BUA. The B2BUA may include call management functions, network interworking, SIP-based VoIP interworking, managing/monitoring entire call state, cloaking endpoint location, centralized call management, and the hiding of network internals. It may maintain records of all requests or connections that are established by tracking each call. Consequently, value-added features may be offered in the call as a result of the B2BUA.

The RFC 3261 specification does not contain any recommendations for B2BUAs on how to associate incoming/outgoing/multiple call legs belonging to the same call/conference. Current B2BUA implementations normally generate a random and unique Call-ID header for the outbound call leg.

RFC3261 describes a Call-ID as a header field acting as a unique identifier to group together a series of messages. It may be the same for all requests and responses sent by either UA in a dialog. In addition, the Call-ID may be one of three elements, in addition to the 'To' tag and the 'From' tag, that define a SIP dialog. The SIP dialog may define a unique peer-to-peer SIP relationship between two entities.

For example, for a message from user A to user B with Call-ID 1111 and another message also from user A to user B but with a Call-ID of 2222, there are two different dialogs or communications sessions. For instance, Call-ID 1111 could be for a VoIP session and Call-ID 2222 could be for an Instant Messaging session. The use of a B2BUA between the endpoints may disrupt the normal peer-to-peer communications between SIP endpoints. The technique used by a SIP endpoint to determine which SIP sessions are a part of a given conference is to rely on the Call-ID. All sessions with the same Call-ID at a given endpoint may be considered to be part of a single conference. If the B2BUA generates random Call-IDs on call legs that it extends, the endpoint will not be able to successfully recognize the conference because of the differing Call-IDs. The ability to maintain the same Call-ID may be required by endpoints for some SIP features, such as MICROSOFT'S MULTI-PARTY IM®. This is one scenario in which a constant Call-ID is required, however, there may be additional programs or circumstances that also require a constant Call-ID. In addition, there may be situations where call legs are terminated and later re-established. In this situation, the generation of a new Call-ID by the B2BUA makes it difficult for the endpoint to recognize that the "new" call leg is simply the reestablishment of the previous call leg. This may be important for historical call tracking.

FIG. 1 illustrates a related art conference setup. FIG. 1 shows a conference 100 in which three users 102, 104, 106 are connected according to the related art. The conference may be an instant messaging ("IM") conference, Voice over IP ("VoIP") call, or any other connection. In this example, there is no B2BUA in the network, so the calls are routed directly. Additionally, there may be a SIP proxy, but it is omitted from FIG. 1. Each User 102, 104, 106 is labeled independently. User A is 102, User B is 104, and User C is 106.

As shown in FIG. 1, User A originates a call with User B by sending an invitation 108 to join in a call. The call may be an IM session. As part of the invitation 108, User A creates a SIP Call-ID, such as 1234. The SIP Call-ID identifies the call. Subsequent to the invitation 108, User B requests 110 that User A invite User C into the call. User A sends invitation 112 to User C using the same Call-ID as from the invitation 108. The invitation 112 may also pass a list of conference participants notifying User C that User A and User B are in the call. User C may then send out invitations to the other parties in the conference. For example, User C sends out invitation 114 to User B using the same Call-ID to identify the call. Accordingly, conference 100 has three endpoints and each have the same Call-ID. From the perspective of an individual endpoint, all sessions that have the same Call-ID are considered to be part of the same conference.

FIG. 1 illustrates a system 100 that has a conference call between endpoints without the presence of a B2BUA. FIG. 2 illustrates a related art system using a B2BUA. Specifically, conference 200 illustrates a conference call is established with a B2BUA 208 in the network in which three users 202, 204, 206 are connected. Additionally, there may be a SIP proxy, but it is omitted from FIG. 2. Each User 202, 204, 206 is labeled independently. User A is 202, User B is 204, and User C is 206.

As shown in FIG. 2, User A originates a call by sending an invitation 210 to User B. User A creates a SIP Call-ID, such as 1234. The invitation 210 goes through the B2BUA 208. The B2BUA generates a new call leg 212 to User B. The generation of new call leg 212 results in the generation of a new Call-ID, such as 2000. User B subsequently may ask User A to also include User C in the call in 214. User A then sends an invitation 216 to User C using the same Call-ID used in the original invitation 210, which is Call-ID 1234, and passes a list of conference participants to User C. The invitation 216 goes through the B2BUA. The B2BUA generates a new call leg 218 to User C. The call leg 218 is generated with a new Call-ID, such as 3000. User C sends out invitation 220 to User B, who is the other user in the conference. The invitation 220 is sent using the same Call-ID that User C received, which is 3000. The invitation 220 goes through the B2BUA. The B2BUA may then generate a new call leg 222 to User C. Call leg 222 results in the generation of another new Call-ID, such as 4000.

The conference 200 that is attempted after call leg 222 includes multiple Call-IDs for the different call legs. At this point, User B is unable to correlate the sessions. User B's session with User A has an ID of 2000 and User B's session with User C has an ID of 4000. As a result, the conference may fail. Accordingly, the use of a B2BUA in the conference 100 results in a conference 200, which fails because of the inability of some endpoints to correlate the sessions between end users.

BRIEF SUMMARY

By way of introduction, the embodiments described below include a system and method for simplifying Session Initiation Protocol ("SIP") Back To Back User Agent ("B2BUA") development by associating different call legs with each other across multiple SIP entities. Call legs may be associated with one another through a common or shared identification.

In a first aspect, a method for associating call legs in a network includes receiving a request over the network for one of the call legs with at least a shared identification value. The call leg is identified over the network with an enhanced identification including the shared identification and a unique identifier for the one of the call legs.

In a second aspect, a computer readable storage medium having stored therein data representing instructions executable by a programmed processor for establishing a conference includes instructions for establishing at least one call leg with a user device. At least one call leg is identified at least partially based on a shared identification value, the shared identification value identifying the conference. At least one call leg is identified based at least partially on a user identification value.

In a third aspect, a method for establishing a conference with a Back to Back User Agent ("B2BUA") includes receiving an initial call identification from a first user at the B2BUA. The call identification includes a shared call identification and a unique identification for a second user. The shared and unique identifications are transmitted to a second user.

In a fourth aspect, a system for establishing a conference includes a network, an interface for routing calls over the network, and a plurality of user devices configured to be connected over the network through the interface. The interface establishes an identification for the user devices. The identification includes a conference identification and a user device identification. The user device identification being unique for each of the user devices.

In a fifth aspect, a method for establishing a session between users includes receiving an invitation for a call from a source user to a target user. The invitation includes a common component. The invitation for the call is transmitted to the target user, and includes the common component and a unique component. The unique component identifies the target user. The session is established between the source user and the target user.

The present invention is defined by the following claims, and nothing in this section should be taken as a limitation on those claims. Further aspects and advantages of the invention are discussed below in conjunction with the embodiments.

BRIEF DESCRIPTION OF THE DRAWINGS

The components and the figures are not necessarily to scale, emphasis instead being placed upon illustrating the principles of the invention.

DETAILED DESCRIPTION OF THE DRAWINGS AND THE PRESENTLY PREFERRED EMBODIMENTS

The embodiments described below include a system and method for simplifying Session Initiation Protocol ("SIP") Back To Back User Agent ("B2BUA"). However, the system and methods may apply to protocols other than SIP, including but not limited to related systems, protocols or architectures. Likewise, the B2BUA may be any entity that acts as an intermediary in any call, communication, or session, such as a SIP call.

Figure 3:
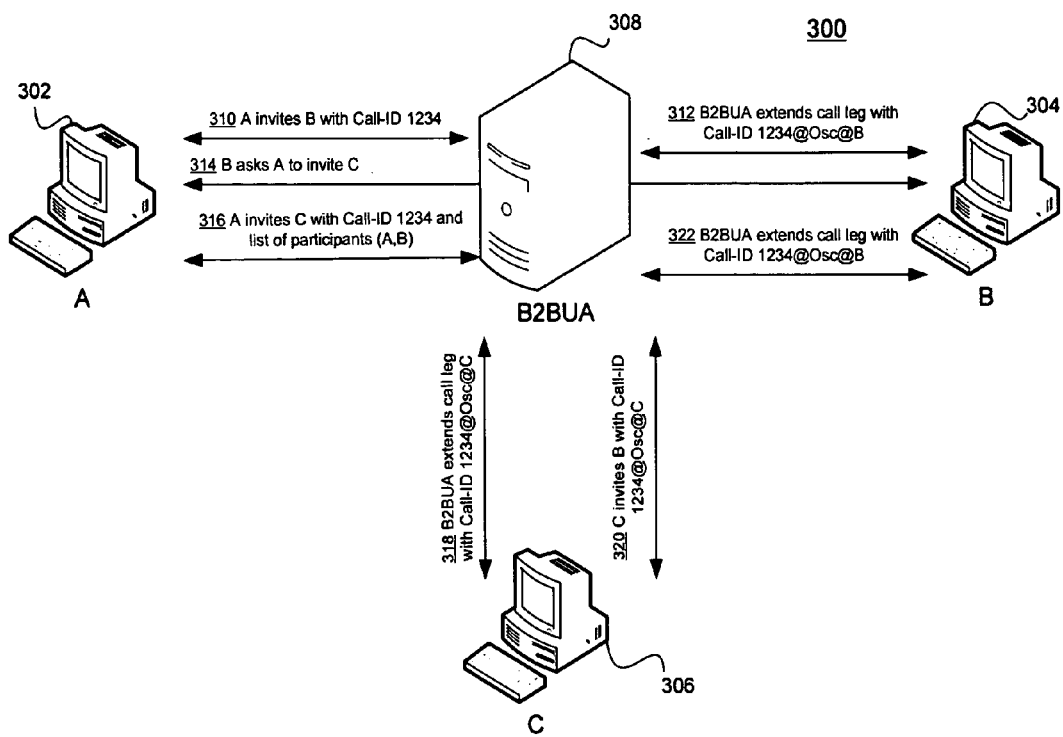
FIG. 3 is a diagram showing one embodiment of a conference.

FIG. 3 is a diagram showing an embodiment of a conference 300. The conference 300 is established with a B2BUA 308 in the network in which three users 302, 304, 306 are connected. Additionally, there may be a SIP proxy, but it is omitted from FIG. 3. Each user 302, 304, 306 is labeled independently. User A is 302, User B is 304, and User C is 306. The user may be referred to as an endpoint or user device.

Figure 1:
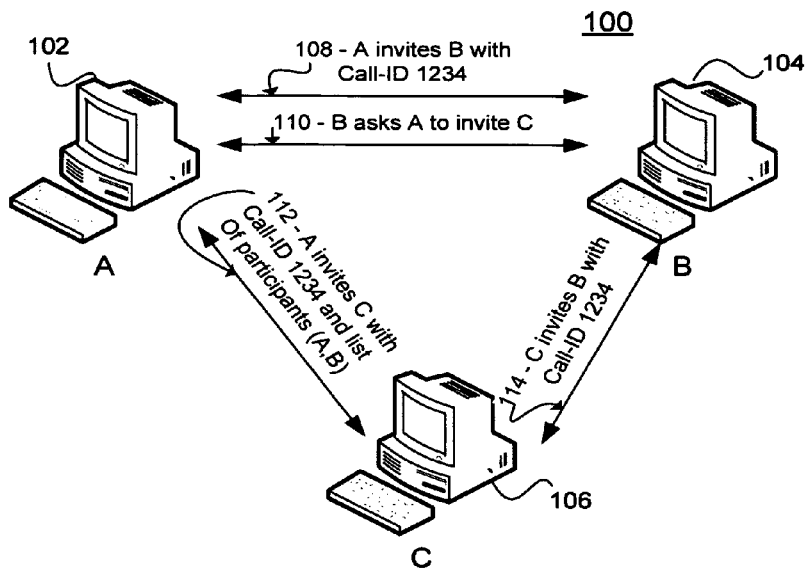
FIG. 1 illustrates a related art system.
Figure 2:
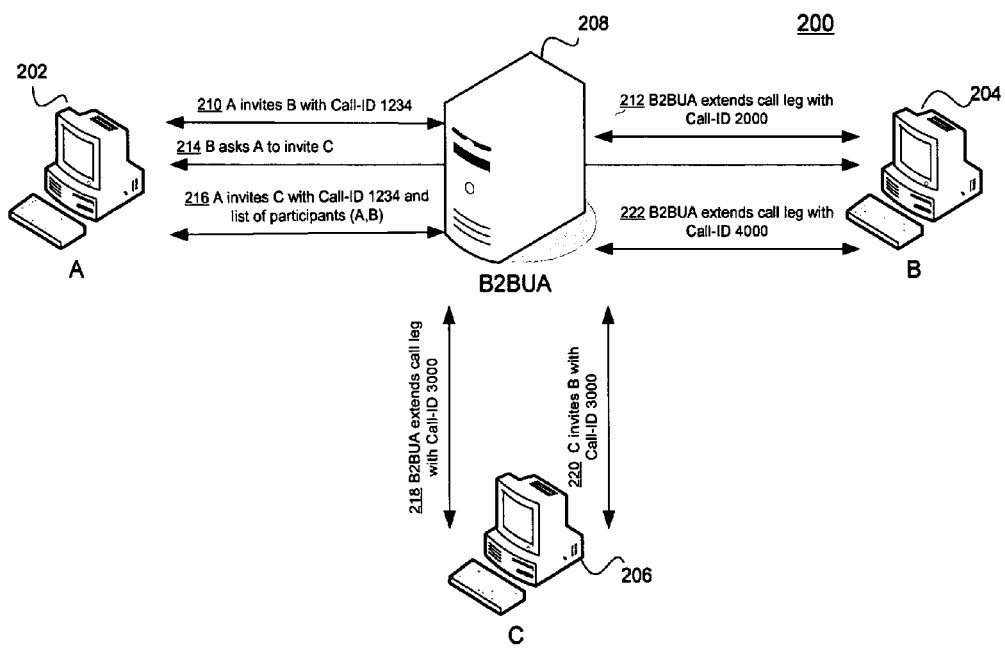
FIG. 2 illustrates a related art system using a B2BUA.

FIG. 3 illustrates an embodiment in which a conference takes place in a B2BUA environment utilizing SIP. In alternate embodiments, the conference may take place in other environments and may include any call, communication, or connection, such as a telephone conversation, video session, instant messaging session, application sharing, or whiteboarding between multiple parties. In FIG. 2, a conference was not able to be established in that B2BUA environment because the call legs were not associated with one another by one or more of the endpoints involved in the interaction. In the embodiment of FIG. 3, the call legs are associated with one another through a unique or enhanced Call-ID, such as in a header code. Call legs may also be referred to as sessions. One or more related call legs may form a conference.

First, User A originates a communication session by sending an invitation 310 to User B. User A may be considered a source user and User B considered a target user. The communication session may include a VoIP call, a video call, an instant messaging connection, an SMS connection, an application sharing connection, a whiteboarding connection, or any other call, connection, or conference. User A creates a SIP Call-ID, such as 1234, which is included in the invitation 310. The Call-ID 1234 is submitted to the B2BUA 308, which generates a new call leg 312 to User B. The new call leg 312 to User B includes the Call-ID 1234@Osc@B. This Call-ID will be discussed in more detail below Referring to FIG. 3, User B sends a request 314 asking User A to invite User C into the conference. User A sends an invitation 316 to User C using the same Call-ID from the original invite, which was 1234. User A also passes a list of conference participants. The invitation 316 goes through the B2BUA, which generates a new call leg 318 to User C with the Call-ID 1234@Osc@C. User C may then send out an invitation 320 to the other parties in the conference. In this embodiment, there is one other party, User B. The invitation 320 is sent by User C using the same Call-ID it received 1234@Osc@C. The invitation 320 goes through the B2BUA, which generates a new call leg 322 to User B with the Call-ID 1234@Osc@B.

Each User 302, 304, 306 can correlate the multiple sessions in the conference because the Call-ID of call legs seen by that user is the same. Likewise, in other embodiments with more Users, the same conference is identified, but the Users may have different Call-IDs, and the Call-IDs are still fixed. Although each User may have a unique Call-ID, the B2BUA and the Users can correlate the different sessions that are established based at least in part on the shared Call-ID.

As discussed above, in one example, the Call-ID header value may be 1234@Osc@C. This header value is one example of a header value with the following structure:

shared-Call-ID@system-host@user-uri

This structure for the Call-ID may be referred to as an enhanced Call-ID. The enhanced Call-ID may include different component or structure than the above example. For example, the use of @ as a delimiter is merely one embodiment and may be modified. Any other character may have been used. The "shared-Call-ID" may be given by an endpoint when the call is originated by an endpoint. Alternatively, it may be generated randomly when the call originates from the B2BUA. The "shared-Call-ID" is a fixed value that does not change for each call leg, or alternatively, may change in a known or predictable way. The "shared-Call-ID" may be used to identify a call across multiple SIP entries and identifies or associates multiple call legs together. In other words, in a conference, the "shared-Call-ID" will be the same for each call leg in the conference, so that each user knows that the call leg belongs to the conference. The "shared-Call-ID" may also be referred to as a common component, a shared identification, or a shared identification value.

In one example, if the shared-Call-ID was the only way to identify a conference, the endpoints may not be able to extract this element from the Call-ID field. Existing endpoints may receive the enhanced Call-ID without modifying their behavior. Existing endpoints may use all of the Call-ID field to make an association. In other words, all of the call legs that have the same entire Call-ID field may be identified as a conference. The B2BUA may generate a coherent set of Call-IDs for any given endpoint, so that they may work unchanged even in an environment with a B2BUA. Accordingly, an endpoint may extract a shared-Call-ID, but it does not have to. It may use the entire Call-ID.

The "system-host" is a host name of a server for a network. In one embodiment, each "system-host" is unique for each B2BUA SIP server in the network. The enhanced Call-ID allows the call to traverse multiple B2BUA's that are identified by the system-host. If there was only one B2BUA in the network, or if there was no need to distinguish between B2BUAs in a network, the system-host identification may be unnecessary. The "system-host" and "shared-Call-ID" identifies all call legs initiated by a single SIP entity. The "system-host" may be considered part of the shared or common identification of the "shared-Call-ID" or may be considered part of the unique identification of the "user-uri" as discussed below.

The "user-uri" identifies the user to whom a call leg may belong. In one embodiment, the "user-uri" may be user@system-host.com. The "user-uri" identifies the user that is the target or endpoint of a call leg. The "user-uri" may be referred to as a unique identifier or unique identification because it is different for each user. Each end user may view a conference as having a single Call-ID. If there are N parties in the conference, the end user may have N−1 call legs, each of which may have the same Call-ID. However, another endpoint will also have N−1 call legs, also with the same Call-ID, but this Call-ID may be different than that seen by the first endpoint. Although there may only be one conference, each endpoint may have a unique Call-ID for that conference. It is the B2BUA according to the embodiments discussed herein that may adjust the Call-ID so that it is appropriate for any given endpoint.

The structure described above is just one embodiment of a header value or Call-ID that may be used to properly operate in a B2BUA environment. Additional embodiments may include more or fewer identifiers and may be arranged in a different structure.

Figure 4:
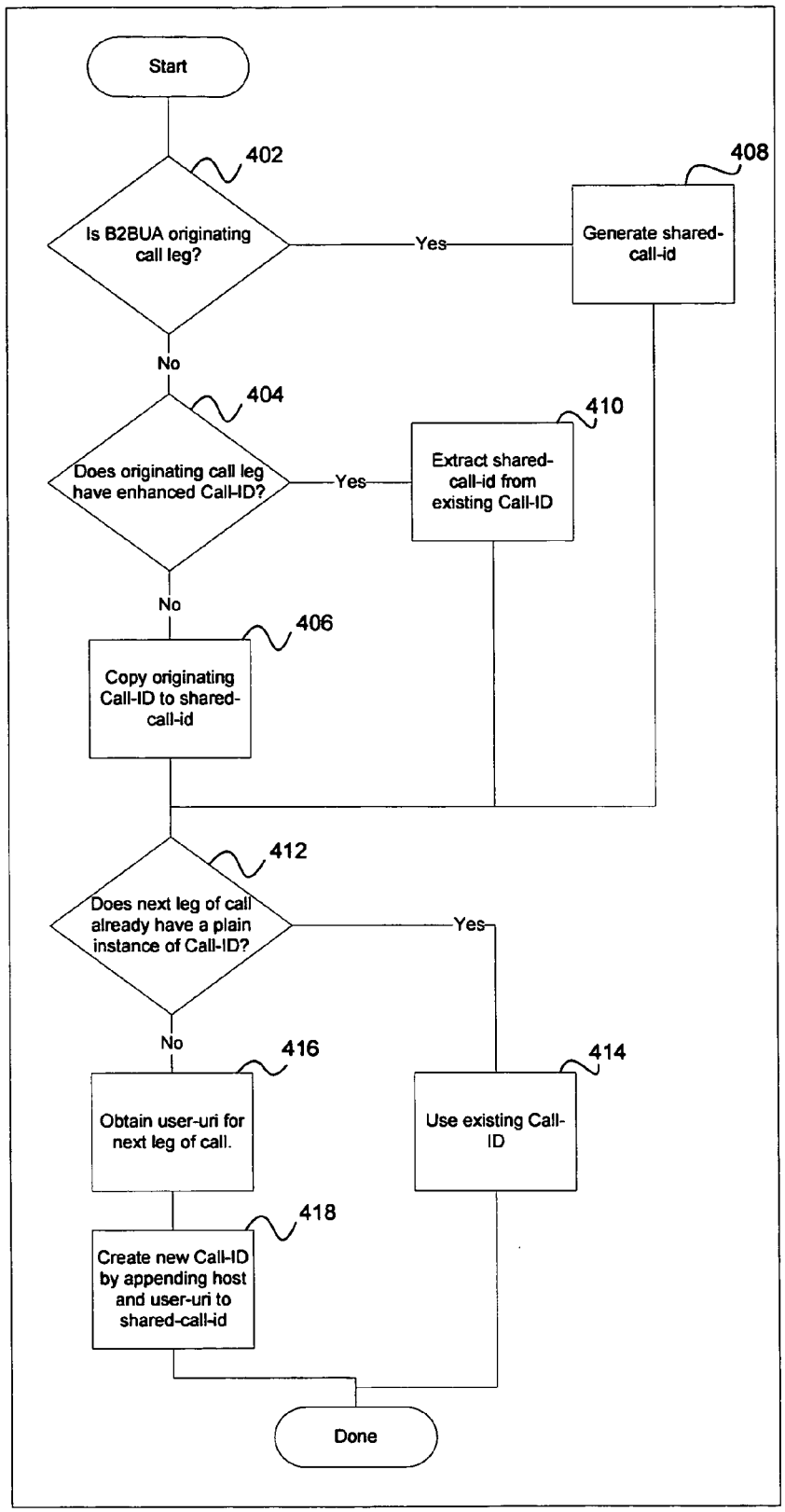
FIG. 4 a flowchart diagram showing one embodiment for identification of calls.

FIG. 4 is a flow chart illustrating the generation of a Call-ID according to the structure described above in FIG. 3. In step 402, a processor considers whether the B2BUA originates the call leg. If the B2BUA does not originate the call leg, then in step 404, the processor looks at the Call-ID. If the Call-ID is not an enhanced Call-ID, then in step 406, the originating Call-ID is copied as the shared-Call-ID. In step 402, if the B2BUA is the originating call leg, then in step 408, a shared-Call-ID is generated. Likewise, in step 404, if the originating Call-ID is an enhanced Call-ID, then in step 410, the shared-Call-ID is extracted from the enhanced Call-ID. After any of steps 406, 408, and 410, the shared-Call-ID is established.

Next, in step 412, the processor considers whether the next leg of the call has a plain instance of the Call-ID. If the next leg of the call does have a plain instance of a Call-ID, then in step 414, that existing Call-ID is used. If the next call leg does not have a plain instance of a Call-ID, then in step 416, a user-uri is obtained. In step 418, a new/enhanced Call-ID is formed from the shared-Call-ID, host, and the user-uri. At this point, the enhanced Call-ID is used for this call leg.

Figure 5:
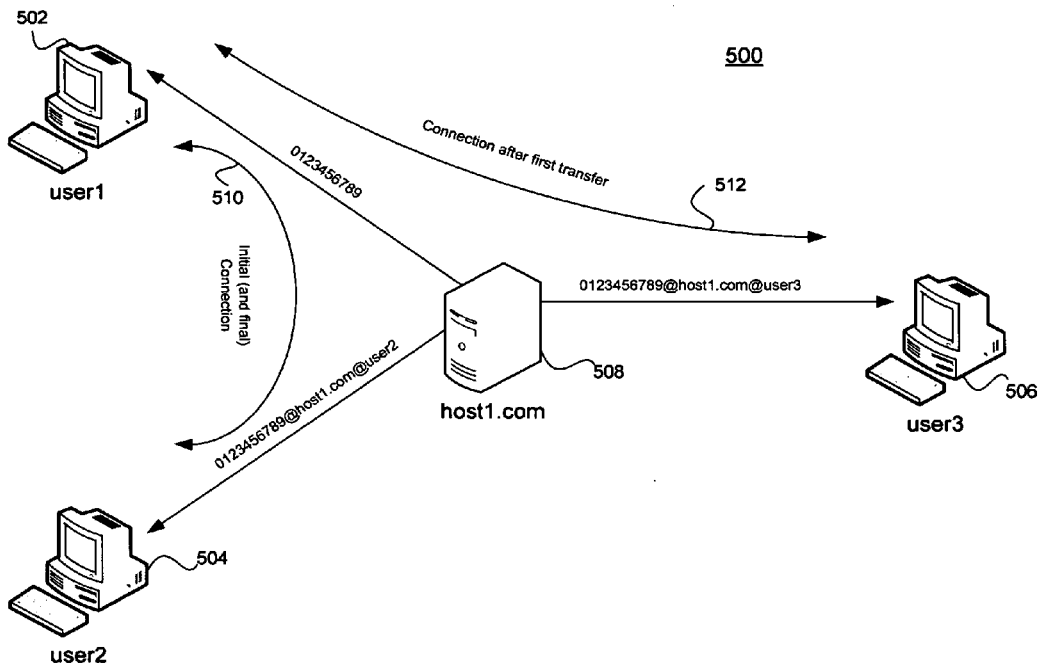
FIG. 5 is a diagram showing an embodiment of a transfer.
Figure 6:
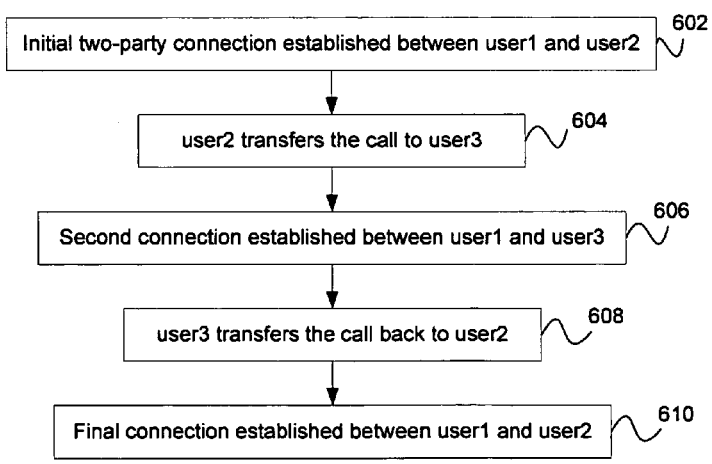
FIG. 6 is a flowchart diagram showing one process for one embodiment of a conference.

FIG. 5 is a diagram of one embodiment of a transfer in three-party call. Transfer 500 illustrates the operation of call legs and Call-IDs upon the transfer of calls. FIG. 6 is a flow chart illustrating the transfer of a call according to one embodiment of transfer 500 in FIG. 5. There may be other SIP proxies involved in the transfer 500, but they are not shown. The following description of FIG. 5 will include the steps shown in FIG. 6.

In step 602, an initial connection 510 is established between a first user, user1 502, and a second user, user2 504. Connection 510 is a two-party call between user1 502 and user2 504 that is established after the B2BUA 508 receives a request from user1 with Call-ID 0123456789 and issues a Call-ID, such as 0123456789@host1.com@user2, for the call leg to user2. As discussed above, this enhanced Call-ID format is "shared-Call-ID@system-host@user-uri" and is generated by the B2BUA 508. Accordingly, the shared-Call-ID is 0123456789 and the system-host is host1.com for user2 504. The user-uri for user2 504 is user2.

After the initial connection 510 between user1 502 and user2 504, user2 504 may transfer the call to user3 506 as in step 604. After the transfer, a second connection 512 is established between user1 502 and user3 506 in step 606. The active call legs for the second connection 512 have similar Call-IDs. Specifically, the Call-ID for the call leg to user3 506 is 0123456789@host1.com@user3, and the Call-ID for the call leg to user1 502 is 0123456789. The Call-ID for the call leg to user1 502 is unchanged from the initial connection 510 to the second connection 512.

In step 608, user3 506 transfers the call back to user2 504. After this transfer, a final connection 510 is established between user1 502 and user2 504 as in step 610. The final connection 510 is the same or similar to the initial connection. The Call-ID in the call leg to user2 504 in the final connection is the same as in the initial connection as 0123456789@host1.com@user2. This same Call-ID is generated if user1 502 transfers a call to user2 504 or if user2 504 is invited to the conference call with both user1 502 and user3 506.

Figure 7:
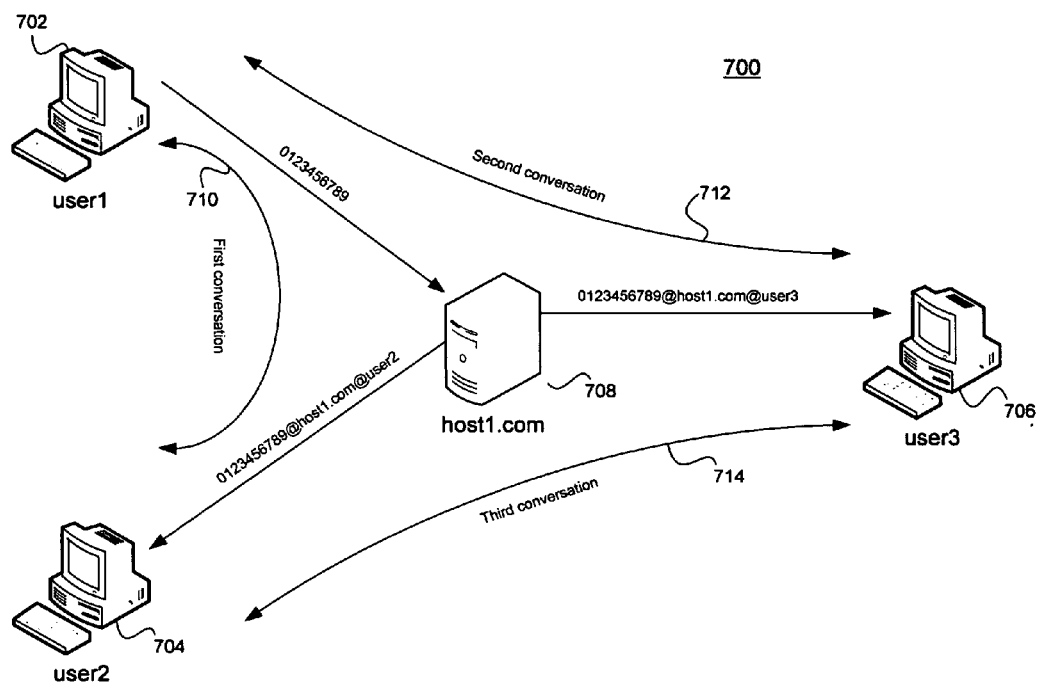
FIG. 7 is a diagram showing another embodiment of a conference.
Figure 8:
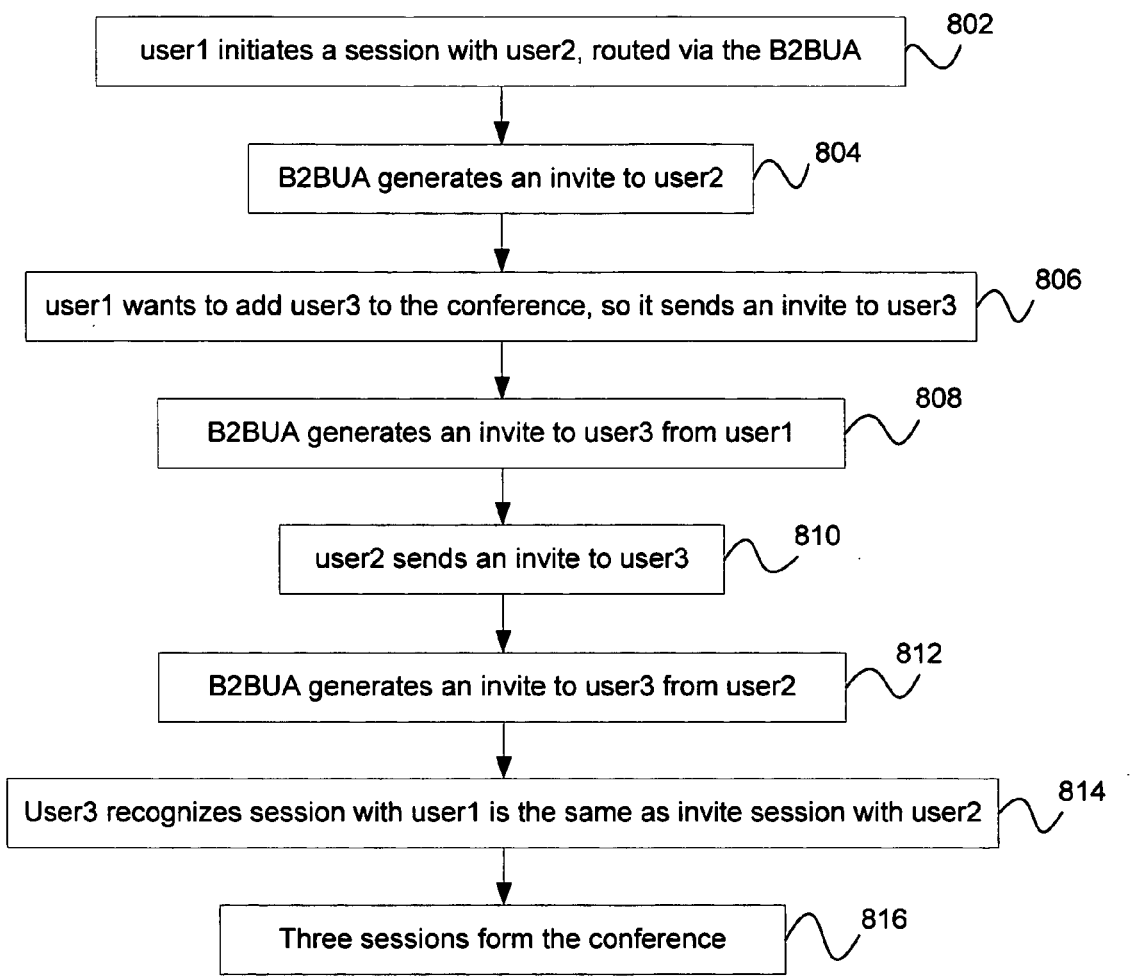
FIG. 8 is a flowchart diagram showing another process for one embodiment of a conference.

FIG. 7 is a further example of a multi-party call. Conference 700 illustrates the operation of call legs and Call-IDs in a multi-party call. FIG. 8 is a flow chart illustrating the transfer of call according to one embodiment of conference 700 of FIG. 7. There may be other SIP proxies involved in the conference 700, but they are not shown. The following description of FIG. 7 will include the steps shown in FIG. 8.

In step 802, a first conversation 710 is established between a first user, user1 702, and a second user, user2 704. The first conversation 710 is a session that user1 initiates with user2 via the B2BUA 708. The B2BUA 708 may send an invite to user2 according to step 804. The first call leg from user1 includes a Call-ID 0123456789. Upon routing through the B2BUA 708, the call leg to user2 has a Call-ID of 0123456789@host1.com@user2 created by the B2BUA 708.

In step 806, user1 702 may then wish to add a third caller to the conference. User1 may send an invite with a Call-ID of 0123456789 to user3 706 via the B2BUA 708. This Call-ID is the same as the Call-ID used in the invite sent to user2 704. In step 808, the B2BUA 708 generates an invite to user3 706 by generating a Call-ID of 0123456789@host1.com@user3. This establishes a second conversation 712 between user1 702 and user3 706 in addition to the first conversation 710 between user1 702 and user2 704.

At this point there is no conversation between user2 704 and user3 706. User2 704 may receive instruction to establish a conversation with user3 to complete the three-party conversation. Alternatively, user3 may receive the instruction as well. In step 810, user2 704 may send an invite to user3 706 via the B2BUA 708. The Call-ID sent by user2 is the Call-ID that it received, which is 0123456789@host1.com@user2. Upon routing through the B2BUA 708, an invite is generated to user3 according to step 812. The B2BUA takes the shared-Call-ID from the incoming Call-ID and generates a Call-ID for user3 706. The Call-ID for the leg to user3 706 is 0123456789@host1.com@user3. This Call-ID is the same as the Call-ID that was generated when user1 702 created its session with user2 704 in the first conversation 710.

In step 814, user3 706 recognizes that the second conversation 712 with user1 702 has the same Call-ID as the invitation from user2 704. Based on the same shared-Call-ID, user3 706 recognizes that the conversations are related. As discussed above, the endpoint may use the entire Call-ID rather than just the shared-Call-ID to identify a conference or related conversations. In step 816, after the user3 706 establishes the third conversation 714 with user2 704, the conference is established between all three users 702, 704, 706. The three conversations 710, 712, 714 establish a single conference. In an N party conference, each endpoint has N−1 connections. For conferences of additional users, the number of conversations also increases. However, the Call-IDs on each additional leg or conversation uniquely associates that leg with the conference.

In the embodiments described above, user1 may be considered to be the master user because user1 originates the conference. In addition, user1 created the first Call-ID, which became the shared-Call-ID within each user's Call-ID. If the originator (user1) leaves the conference and then rejoins, its Call ID may not be the original shared-Call-ID as when the conference was originated, but it may be the entire enhanced Call ID. Regardless, the shared-Call-ID that identifies the conference remains unchanged.

Note that the identification of a conference through each of the call legs from the users may be accomplished through other scenarios, schemes, or call flows not specifically embodied or discussed in the description herein. Specifically, the Call-ID structure discussed above may be arranged or organized differently. The Call-ID or identification identifies the user in addition to the interface or B2BUA between the users.

Referring back to FIGS. 1-3, 5, and 7, the users may be or include a user device that is configured to connect with a network. The user devices may be any computing device, such as, but not limited to a personal computer, a personal digital assistant ("PDA"), a telephone, a cellular telephone, a VoIP telephone, etc. The user device may include any combination of the components illustrated in the computer system 900 of FIG. 9. Specifically, the computer system 900 may be one embodiment of a user device or user as discussed herein.

The computer system 900 may include a set of instructions that can be executed to cause the computer system 900 to perform any one or more of the methods or computer based functions disclosed herein. The user device or computer system 900 may be connected, e.g., using a network, to other computer systems, user devices, or peripheral devices. The connection may be established using a SIP protocol with a B2BUA.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various user devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a VoIP telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

Figure 9:
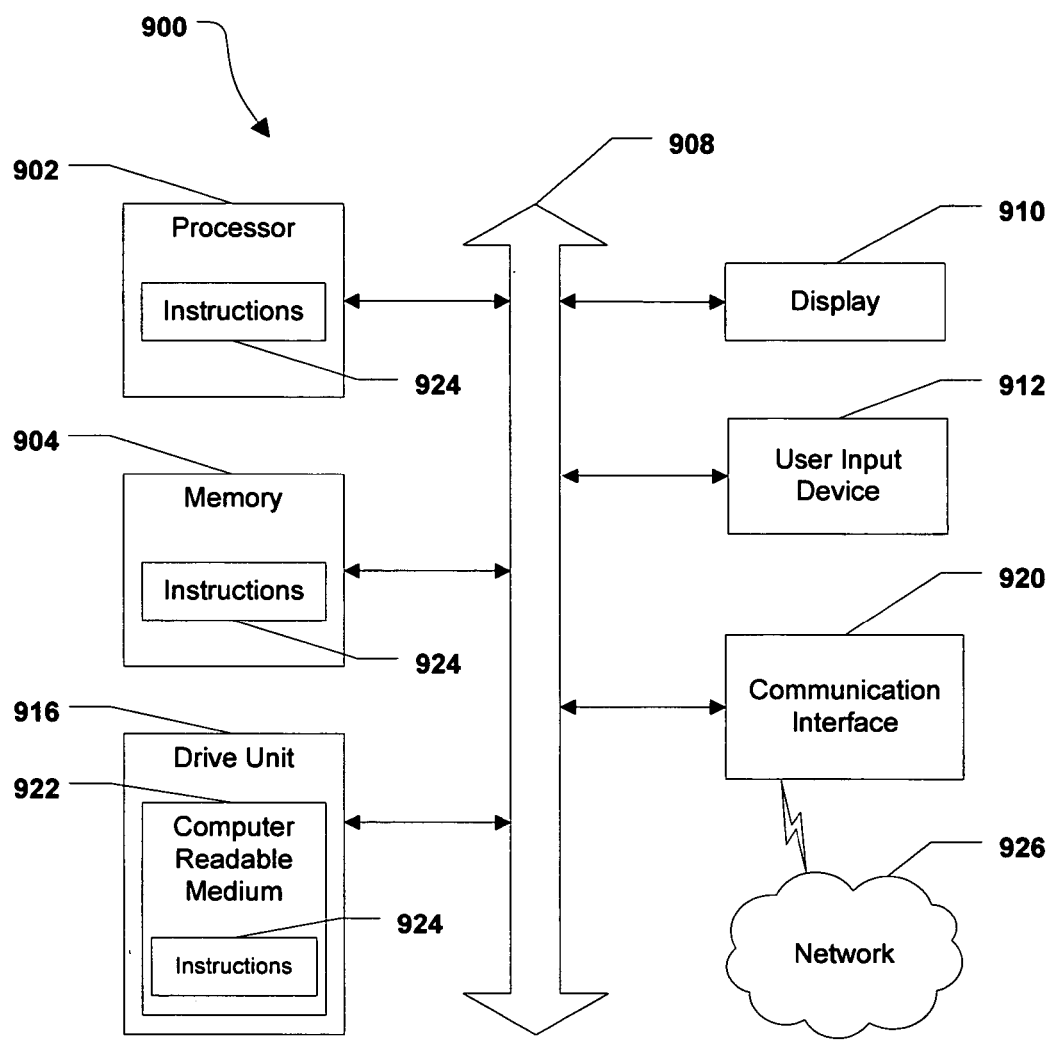
FIG. 9 is a diagram showing a computer system or user device.

As illustrated in FIG. 9, the user device or computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The user device or computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 904 includes a cache or random access memory for the processor 902. In alternative embodiments, the memory 904 is separate from the processor 902, such as a cache memory of a processor, the system memory, or other memory. The memory 904 may be an external storage device or database. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

As shown, the user device or computer system 900 may further include a display unit 914, such as a liquid crystal display (LCD), an organic light emitting diode (OLED), a flat panel display, a solid state display, a cathode ray tube (CRT), a projector, a printer or other now known or later developed display device for outputting determined information. The display 914 may act as an interface for the user to see the functioning of the processor 902, or specifically as an interface with the software stored in the memory 904 or in the drive unit 906.

Additionally, the user device or computer system 900 may include an input device 916 configured to allow a user to interact with any of the components of system 900. The input device 916 may be a number pad, a keyboard, or a cursor control device, such as a mouse, or a joystick, touch screen display, remote control or any other device operative to interact with the system 900.

In a particular embodiment, as depicted in FIG. 9, the user device or computer system 900 may also include a disk drive unit 906. The disk or optical drive unit 906 may include a computer-readable medium 910 in which one or more sets of instructions 912, e.g. software, can be embedded. Further, the instructions 912 may embody one or more of the methods or logic as described herein. In a particular embodiment, the instructions 912 may reside completely, or at least partially, within the memory 904 and/or within the processor 902 during execution by the computer system 900. The memory 904 and the processor 902 also may include computer-readable media as discussed above.

The present disclosure contemplates a computer-readable medium that includes instructions 912 or receives and executes instructions 912 responsive to a propagated signal, so that a device connected to a network 920 can communicate voice, video, audio, images or any other data over the network 920. Further, the instructions 912 may be transmitted or received over the network 920 via a communication port 918. The communication port 918 may be a part of the processor 902 or may be a separate component. The communication port 918 may be created in software or may be a physical connection in hardware. The communication port 918 is configured to connect with a network 920, external media, the display 914, or any other components in system 900, or combinations thereof. The connection with the network 920 may be a physical connection, such as a wired Ethernet connection or may be established wirelessly as discussed below. Likewise, the additional connections with other components of the system 900 may be physical connections or may be established wirelessly.

The network 920 may include wired networks, wireless networks, or combinations thereof. The wireless network may be a cellular telephone network, an 802.11, 802.16, 802.20, or WiMax network. Further, the network 920 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive or limiting, and the appended claims are intended to cover all such modifications, enhancements, and other embodiments, which fall within the true spirit and scope of the present invention. Thus, to the maximum extent allowed by law, the spirit and scope of the present invention is to be determined by the broadest permissible interpretation of the following claims, including all equivalents, and shall not be restricted or limited by the foregoing detailed description.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The invention claimed is:

1. A method for associating call legs in a network, the method comprising:
   a first endpoint generating a first enhanced call-id for a communication session with a second endpoint, the first enhanced call-id comprising a first shared call-id and a first unique identifier;
   the first endpoint sending the first enhanced call-id to a Back to Back User Agent ("B2BUA");
   the B2BUA generating a first call leg between the first endpoint and the second endpoint using the first enhanced call-id;
   the first endpoint generating a second enhanced call-id to join a third endpoint to the communication session, the second enhanced call-id comprising a second shared call-id and a second unique identifier;
   the first endpoint sending the second enhanced call-id to the B2BUA;
   the B2BUA generating a second call leg between the first endpoint and the third endpoint using the second enhanced call-id;
   the third endpoint generating a third enhanced call-id, the third enhanced call-id comprising a third shared call-id and a third unique identifier;
   the third endpoint sending the third enhanced call-id to the B2BUA; and
   the B2BUA generating a third call leg between the third endpoint and the second endpoint using the third enhanced call-id; and
   wherein the first call leg, the second call leg, and the third call leg together comprise a conference between the first endpoint, the second endpoint, and the third endpoint; and
   wherein the first unique identifier corresponds to the first endpoint, the second unique identifier corresponds to the second endpoint, and the third unique identifier corresponds to the third endpoint.

2. The method of claim 1 further comprising:
the first endpoint generating a further enhanced call-id to join a further endpoint to the communication session;
the first endpoint submitting the further enhanced call-id to the B2BUA, and the B2BUA generating a plurality of further call legs between the further endpoint and the first endpoint, the second endpoint, and the third endpoint using the further enhanced call-id; and
wherein the further enhanced call-id comprises a further shared call-id and a further unique identifier; and
wherein the further unique identifier corresponds to the further endpoint.

3. The method of claim 1 wherein the first shared call-id, the second shared call-id, and the third shared call-id are different values, each of the different values differ in accordance with a predetermined method.

4. The method of claim 1, wherein the first shared call-id, the second shared call-id, and the third shared call-id are the same.

5. The method of claim 1, wherein the first enhanced call-id further comprises a host identification, wherein the second enhanced call-id further comprises the host identification, and wherein the third enhanced call-id further comprises the host identification.

6. The method of claim 5 wherein the host identification comprises an identifier for the B2BUA.

7. The method of claim 1 wherein the communication session comprises a VoIP call, a video call, an instant messaging connection, or an application sharing connection.

8. The method of claim 1, wherein the first enhanced call-id further comprises a list of participants for the communication session.

9. The method of claim 1, wherein the first endpoint, the seconds endpoint, the third endpoint, and the B2BUA utilize Session Initiation Protocol ("SIP").

10. The method of claim 1 further comprising the second endpoint requesting that the first endpoint join the third endpoint to the communication session.

11. The method of claim 1 wherein the first endpoint comprises a PDA, a VoIP telephone, or a personal computer.

12. A method for associating call legs in a network, the method comprising:
a first Session Initiation Protocol ("SIP") endpoint generating a first enhanced call-id for a communication session with a second SIP endpoint, the first enhanced call-id comprising a shared call-id and a first unique identifier;
the first SIP endpoint sending the first enhanced call-id to a Back to Back User Agent ("B2BUA");
the B2BUA generating a first call leg between the first SIP endpoint and the second SIP endpoint, the first call leg being generated with the first enhanced call-id;
the first SIP endpoint generating a second enhanced call-id to join a third SIP endpoint to the communication session, the second enhanced call-id comprising the shared call-id and a second unique identifier;
the first SIP endpoint sending the second enhanced call-id to the B2BUA;
the B2BUA generating a second call leg between the first SIP endpoint and the third SIP endpoint, the second call leg being generated with the second enhanced call-id;
the second SIP endpoint generating a third enhanced call-id, the third enhanced call-id comprising the shared call-id and a third unique identifier;
the second SIP endpoint sending the third enhanced call-id to the B2BUA; and the B2BUA generating a third call leg between the second SIP endpoint and the third SIP endpoint using the third enhanced call-id; and
wherein the first call leg, the second call leg, and the third call leg together comprise a voice conference between the first SIP endpoint, the second SIP endpoint, and the third SIP endpoint; and
wherein the first unique identifier corresponds to a device identification of the first endpoint, the second unique identifier corresponds to a device identification of the third endpoint, and the third unique identifier corresponds to a device identification of the second endpoint.

13. The method of claim 12 wherein the first shared call-id, the second shared call-id, and the third shared call-id are different.

14. The method of claim 12, wherein the first enhanced call-id further comprises a list of participants for the communication session.

15. The method of claim 12, wherein the first enhanced call-id further comprises a host identification, wherein the second enhanced call-id further comprises the host identification, wherein the third enhanced call-id further comprises the host identification, and wherein the host identification comprises an identifier of the B2BUA.

16. A system for establishing a conference, the system comprising:
a first endpoint;
a second endpoint;
a third endpoint; and
a Back to Back User Agent ("B2BUA") for generating call legs in the conference; and
wherein the first endpoint generates a first enhanced call-id for the conference; and
wherein the B2BUA receives the first enhanced call-id from the first endpoint and uses the first enhanced call-id to generate a first call leg between the first endpoint and the second endpoint; and
wherein the first endpoint generates a second enhanced call-id to join a third endpoint to the conference; and
wherein the B2BUA receives the second enhanced call-id from the first endpoint; and
wherein the B2BUA uses the second enhanced call-id to generate a second call leg between the first endpoint and the third endpoint; and
wherein the third endpoint generates a third enhanced call-id; and
wherein the B2BUA receives the third enhanced call-id from the third endpoint; and
wherein the B2BUA uses the third enhanced call-id to generate a third call leg between the third endpoint and the second endpoint; and
wherein the first enhanced call-id comprises a first shared call-id and a first unique identifier; and
wherein the second enhanced call-id comprises a second shared call-id and a second unique identifier; and
wherein the third enhanced call-id comprises a third shared call-id and a third unique identifier; and
wherein the first unique identifier corresponds to the first endpoint, the second unique identifier corresponds to the second endpoint, and the third unique identifier corresponds to the third endpoint.

17. The system of claim 16, wherein the first shared call-id, the second shared call-id, and the third shared call-id are different values, each of the different values differ in accordance with a predetermined method.

18. The system of claim 16, wherein the first enhanced call-id further comprises a list of participants for the conference.

19. The system of claim 16, wherein the first enhanced call-id further comprises a host identification, wherein the second enhanced call-id further comprises the host identification, wherein the third enhanced call-id further comprises the host identification, and wherein the host identification comprises an identifier of the B2BUA.

20. A method for associating call legs in a network, the method comprising:
   a first endpoint generating an initial connection request for a first communication session with a second endpoint and sending the initial connection request to a Back to Back User Agent ("B2BUA"), the initial connection request comprising a shared call-id and a first unique identifier;
   the B2BUA generating a first call leg to the second endpoint, the first call leg establishing the first communication session between the first endpoint and the second endpoint;
   the second endpoint transferring the first communication session to a third endpoint, the transferring step comprising the second endpoint generating a transfer connection request to establish a second communication session between the first endpoint and the third endpoint and sending the transfer connection request to the B2BUA, the transfer connection request comprising the shared call-id and a second unique identifier; and
   the B2BUA generating a second call leg to the third endpoint, the second call leg establishing the second communication session between the first endpoint and the third endpoint; and
   wherein the first unique identifier corresponds to the second endpoint, and the second unique identifier corresponds to the third endpoint.

21. The method of claim 20 further comprising the third endpoint transferring the second communication session to the second endpoint, the transferring the second communication session to the second endpoint comprising the third endpoint generating a further transfer connection request to re-establish the first communication session between the first endpoint and the second endpoint and sending the further transfer connection request to the B2BUA, and wherein the further transfer connection request comprises the shared call-id and the first unique identifier.

* * * * *